United States Patent [19]
Farrer et al.

[11] Patent Number: 5,909,640
[45] Date of Patent: *Jun. 1, 1999

[54] WIRELESS COMMUNICATION SYSTEM FOR ADAPTING TO FREQUENCY DRIFT

[75] Inventors: Leland M. Farrer, Morgan Hill; Joseph S. Chan, Milpitas; Robert F. Garry, Jr., San Jose; Charles A. Glorioso, Castro Valley; Norman F. Krasner, San Carlos, all of Calif.

[73] Assignee: Whisper Communications, Inc., Sunnyvale, Calif.

[*] Notice: This patent is subject to a terminal disclaimer.

[21] Appl. No.: 08/944,832

[22] Filed: Oct. 6, 1997

Related U.S. Application Data

[63] Continuation of application No. 08/376,109, Jan. 20, 1995, Pat. No. 5,734,966.

[51] Int. Cl.$^6$ ........................................ H04B 1/54
[52] U.S. Cl. ........................ 455/63; 455/69; 455/77; 455/119
[58] Field of Search ...................... 455/507, 517, 455/62, 63, 75, 76, 87, 85, 86, 69, 119; 375/200, 202, 326; 370/280; 340/825.54

[56] References Cited

U.S. PATENT DOCUMENTS

| | | |
|---|---|---|
| 3,656,112 | 4/1972 | Paull . |
| 3,916,412 | 10/1975 | Amoroso, Jr. . |
| 3,983,484 | 9/1976 | Hodama . |
| 4,063,173 | 12/1977 | Nelson et al. . |
| 4,103,250 | 7/1978 | Jackson . |
| 4,134,068 | 1/1979 | Richardson . |
| 4,216,546 | 8/1980 | Litt . |
| 4,554,668 | 11/1985 | Deman et al. . |
| 4,601,059 | 7/1986 | Gammenthaler . |
| 4,680,582 | 7/1987 | Mejia . |
| 4,704,585 | 11/1987 | Lind . |
| 4,979,170 | 12/1990 | Gilhousen et al. ..................... 455/12.1 |
| 5,113,416 | 5/1992 | Lindell ...................................... 455/69 |
| 5,134,615 | 7/1992 | Freeburg et al. . |
| 5,159,704 | 10/1992 | Pirolli et al. .............................. 455/69 |
| 5,276,703 | 1/1994 | Budin et al. . |
| 5,361,401 | 11/1994 | Pirillo . |
| 5,422,889 | 6/1995 | Sevenhans et al. . |
| 5,454,010 | 9/1995 | Leveque . |
| 5,479,441 | 12/1995 | Tymes et al. . |
| 5,515,365 | 5/1996 | Sumner . |

*Primary Examiner*—Edward F. Urban
*Attorney, Agent, or Firm*—David R. Gildea

[57] ABSTRACT

A wireless communication system with one or more remote transceivers for transmitting a wireless data signal at an actual frequency that is different than the expected frequency and a base transceiver that can automatically adjust to receive the actual frequency. Each remote transceiver is adapted to initiate a wireless data signal at a selected time that is unique to that remote transceiver. The expected frequency is sequentially pre-determined in a pseudo-random sequence with each remote transceiver having a unique sequence. The base transceiver can respond to the remote transceiver at the actual frequency. Both the remote transceiver and the base transceiver can convert the wireless signals in a single step to baseband.

24 Claims, 6 Drawing Sheets

5,909,640

WIRELESS COMMUNICATION SYSTEM FOR ADAPTING TO FREQUENCY DRIFT

This application is a continuation of application Ser. No. 08/376,109 filed Jan. 20, 1995, now U.S. Pat. No. 5,734,966.

BACKGROUND OF THE INVENTION

1. Field of the Invention

The invention relates generally to a wireless communication system and more particularly to a wireless communication system having a base transceiver that can adjust to a carrier frequency transmitted by a remote transceiver and respond on that same frequency. The remote transceiver receiver and the base transceiver can convert wireless signals directly to baseband.

2. Description of the Prior Art

Wireless communication systems are useful for transmitting information between remote sites and a user location. Typically, such systems include a transceiver at each remote site, a base transceiver at the user location, and a wireless communication link coupling the remote transceivers to the base transceiver.

Two important figures of merit for such systems are system cost and remote transceiver battery lifetime. When multiple remote transceivers are used, the cost of the remote transceiver becomes a determining factor in the cost of the system. Because line power is frequently unavailable at remote sites, most remote transceivers are powered by an internal battery. In order to maximize battery lifetime the remote transceiver is switched on for a minimum period of time when information is communicated and switched off or to standby otherwise.

A difficulty with such systems is that the remote transceiver must be capable of receiving a signal of the frequency transmitted by the base transceiver. One existing solution is to include a frequency sweep capability in the remote transceiver to search frequencies until the correct frequency is found. However, this solution adds cost and reduces battery life due to the additional power on time required for the frequency sweep. Another existing solution is to provide a stable, accurate frequency source in the remote transceiver. This solution also adds to the system cost due to the need for stable, accurate components to provide the frequency in the remote transceiver. Another solution is to use a wide bandwidth in the remote transceiver to receive the frequency transmitted from the base transceiver without requiring a search or a stable, accurate frequency source. However, with the wide bandwidth the remote transceiver will receive more noise and will have less selectivity between frequency channels.

Wireless receivers and transmitters are categorized as simplex, full-duplex, or half-duplex. Simplex receivers only receive and simplex transmitters only transmit. Full-duplex transceivers transmit and receive simultaneously. Half-duplex transceivers transmit and receive sequentially. A problem with simplex receivers and transmitters is that control information cannot be received by the transceiver sending the application information and vice versa. Full-duplex transceivers have the advantage that more information can be communicated in a given time period. However, full-duplex transceivers are more expensive than half-duplex transceivers due to the additional circuitry required to transmit and receive in parallel. Known, half duplex transceivers transmit and receive at different frequencies. A problem with using different frequencies is that each frequency requires circuitry that adds to the cost of the transceiver. Another problem is that the time to switch between frequencies and for the frequencies to stabilize adds to the on time in the transceiver, thereby increasing power consumption and decreasing battery life.

Most full-duplex and half-duplex transceivers down convert the frequency of the wireless signal to an intermediate frequency in a first step and down convert the intermediate frequency to baseband in a second step. An advantage of a two step down conversion is that the close-in phase noise of the local oscillator signal used to down convert the wireless signal does not decrease the sensitivity of the system. However, the circuitry for two conversion steps is more complex than the circuitry for one conversion step, thereby adding cost and power consumption of the system.

In most systems, a base transceiver initiates the communication with a remote transceiver. A problem with initiating communication from the base transceiver is that the remote transceiver is required to be at least partially operational for at least some time before the communication arrives. The time and the partial operation require battery power to be consumed.

There is a need for a wireless communication system wherein the cost of the system is minimized by reducing the cost of the remote transceivers. There is a further need to minimize the power consumption in the remote transceiver in order to increase the lifetime of its internal battery.

SUMMARY OF THE INVENTION

It is therefore an object of the present invention to provide a wireless communication system including a remote transceiver that can transmit a wireless signal at an actual frequency that is allowed to drift.

Another object is to provide a wireless communication system having a base transceiver that can automatically adjust to receive the actual frequency of a wireless signal.

Another object is to provide a wireless communication system having a remote transceiver that can transmit and receive wireless signals at the same frequency.

Another object is to provide a wireless communication system having a base transceiver that can respond to a received wireless signal by transmitting a wireless signal at the received frequency.

Another object is to provide a wireless communication system having one or more remote transceivers that transmit a wireless signal at selected times.

Another object is to provide a wireless communication system having a remote transceiver to down convert a wireless signal in a single conversion step to baseband.

Briefly, the preferred embodiment of the present invention includes multiple remote transceivers and a base transceiver. The remote transceivers provide for transmission of wireless data signals that include application data and for reception wireless return signals that include control information. The base transceiver is adapted to receive the wireless data signals, tune to the actual frequencies, and transmit the wireless return signals.

An advantage of the present invention is that the remote transceiver is not required to provide an exact, expected frequency, thereby reducing the cost of the remote transceiver.

Another advantage of the present invention is that the base transceiver includes a capability of adjusting to the actual frequency received in the wireless data signal, thereby eliminating the requirement for a precise local oscillator frequency in a remote transceiver.

Another advantage of the present invention is that the remote transceiver transmits and receives at the same frequency, eliminating the need for two internal frequency sources or switching frequencies in a signal frequency source, thereby reducing the cost and power consumption in the remote transceiver.

Another advantage of the present invention is that the base transceiver responds at the actual frequency, thereby allowing the remote transceiver to transmit and receive on the same frequency.

Another advantage of the present invention is that each remote transceiver has a selected time to transmit, thereby allowing multiple remote transceivers to communicate with a single base transceiver.

Another advantage of the present invention is that the remote transceiver down converts in a single conversion step, thereby reducing the cost and power consumption in the remote transceiver.

These and other objects and advantages of the present invention will no doubt become obvious to those of ordinary skill in the art after having read the following detailed description of the preferred embodiment which are illustrated in the various figures.

IN THE DRAWINGS

DETAILED DESCRIPTION OF THE PREFERRED EMBODIMENTS

Figure 1:
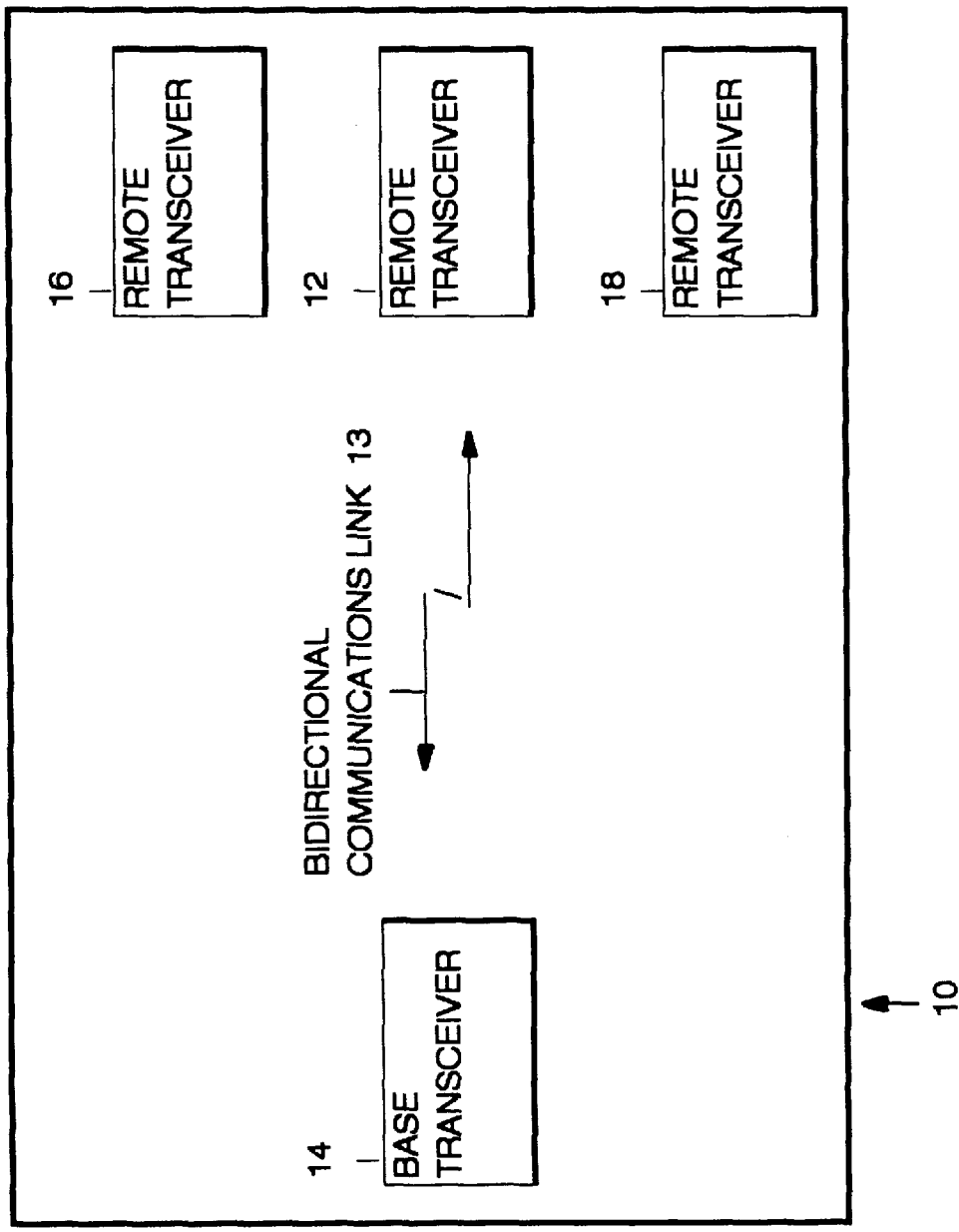
FIG. 1 is a block diagram of a wireless communication system of the present invention.

FIG. 1 illustrates a wireless communication system of the present invention and referred to by the general reference number 10. The system 10 includes a remote transceiver 12 to communicate, over a wireless bilateral communication link 13, with a base transceiver 14. In the preferred embodiment, the bilateral communication link 13 operates in a frequency range of approximately 902 MHz to approximately 928 MHz. Typically, the system 10 will include multiple remote transceivers as represented by additional remote transceivers 16 and 18. The system 10 operates in bursts, with each burst having a selected time and a pre-determined carrier frequency. The pre-determined frequency for the remote transceiver 12, 16 and 18 is a successive entry in a pseudo-random sequence that is unique to that remote transceiver 12, 16 and 18 to give the effect of a frequency hop spread spectrum. The time length of the burst is less than four hundred milliseconds, thereby meeting the FCC requirements for spread spectrum communication. The selected time for the remote transceiver 12, 16 and 18 is controlled by the base transceiver 14 to avoid collisions. In the preferred embodiment, the system 10 uses an FSK modulation having a rate of 2.4 kilo baud and a frequency deviation of approximately, six KHz. Alternatively, the system 10 can use phase modulation, such as binary phase shift key (BPSK), constant amplitude BPSK, quadrature phase shift key (QPSK), offset QPSK, constant amplitude QPSK, MSK, eight phase shift key (8PSK), or equivalent, or frequency modulation, such as FM. The remote transceivers 12, 16 and/or 18 initiate the burst by transmitting a wireless data signal. The wireless data signal includes a preamble, a frame character, and application data. Although the carrier frequency is pre-determined, component drift in the remote transceiver 12, 16 and/or 18 due to aging and change in temperature can cause a frequency error of up to $30 \times 10^6$ times the approximate RF frequency of the link 13. The actual frequency of the wireless data signal is the sum of the pre-determined frequency and the current frequency error.

At the selected time, the base transceiver 14 tunes to an expected frequency of the sum of the pre-determined frequency and the frequency error of the last wireless data signal burst. When the preamble has been received, the base transceiver 14 automatically adjusts to the actual frequency in order to receive the application data. When the application data has been received, the base transceiver 14 responds by transmitting a wireless return signal at the same frequency. The wireless return signal includes a preamble, a frame character, and control information, such as a selected time for the next burst, and to acknowledge to the remote transceiver 12, 16 and/or 18 that the application data was received. In one application of the wireless communication system 10, the application data indicates the metering of gas through a gas meter located at a residence or place of business.

Figure 2:
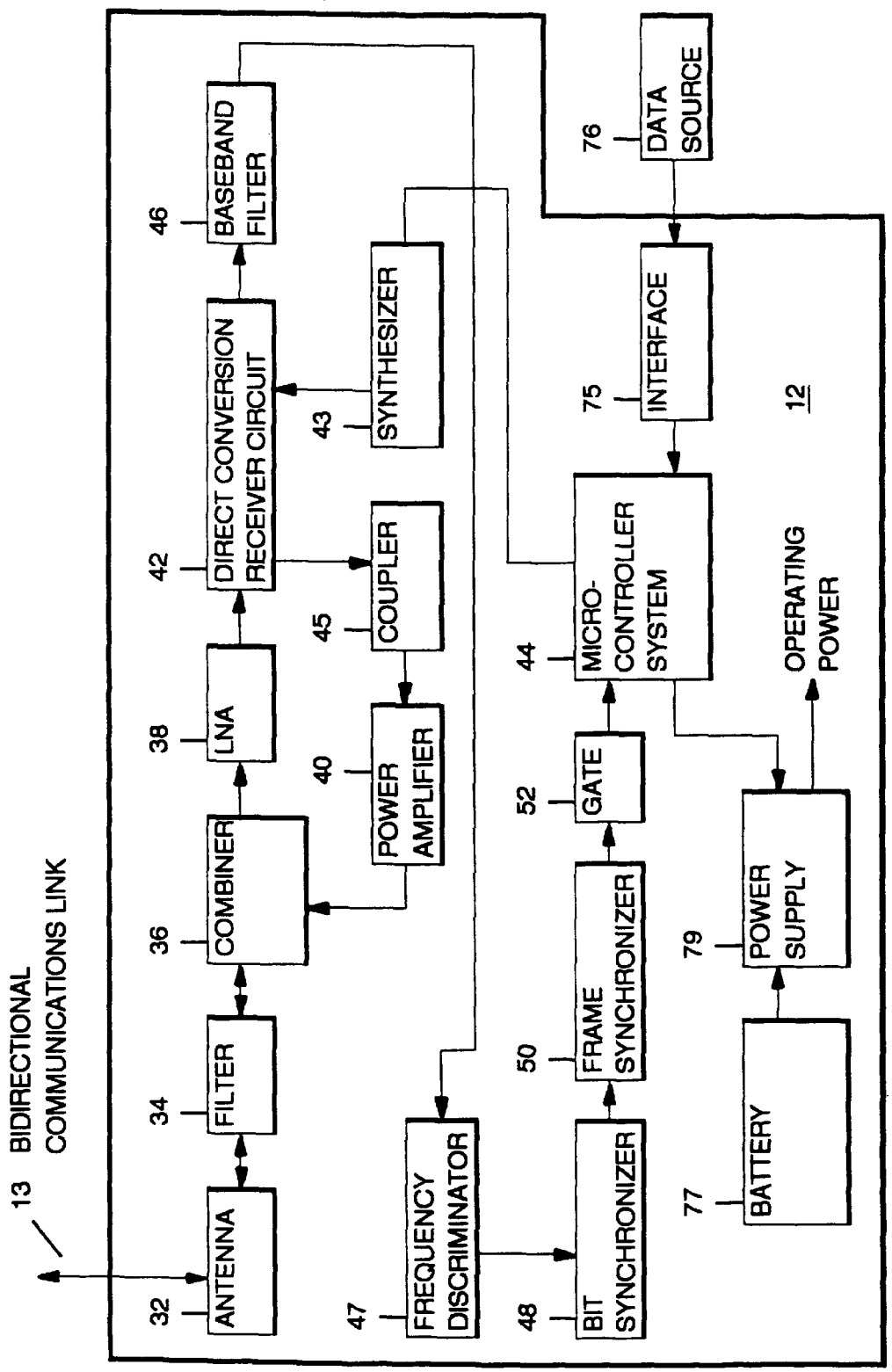
FIG. 2 is a block diagram of a remote transceiver of the wireless communication system of FIG. 1.

FIG. 2 illustrates the remote transceiver 12, which includes an antenna 32, such as a dipole, tuned to radiate wireless signals in the frequency range of the bilateral communication link 13. The antenna 32 receives the wireless return signal from the base transceiver 14 and issues a responsive, conducted, radio frequency (RF) return signal through a filter 34 to a combiner 36. The filter 34, may be implemented as a three pole ceramic, tuned for a maximally flat passband within the frequency range of the bidirectional communication link 13 and three dB insertion loss at the highest and lowest frequencies of the bilateral communication link 13. The antenna 32 further receives a conducted, RF data signal through the filter 34 from the combiner 36 and responsively transmits the wireless data signal. The combiner 36 issues the RF return signal to a low noise amplifier (LNA) 38 and receives the RF data signal from a power amplifier 40. The LNA 38 issues an amplified RF return signal. In the preferred embodiment, the combiner 36 is a "Wilkenson" bridge providing a nominal thirty dB of isolation between a first RF signal received from the power amplifier 40 and a second RF signal passed to the LNA 38, the LNA 38 has a nominal gain of thirteen to fifteen dB and a nominal noise figure of 1.5 dB, and the power amplifier 40 has a nominal gain of twenty to thirty dB and a nominal output power of zero dBm. A direct conversion receiver circuit 42 receives the amplified RF return signal from the LNA 38 and receives a synthesizer output signal from a synthesizer 43. The synthesizer 43, including a voltage controlled oscillator (VCO) to generate the synthesizer output signal and a reference oscillator to generate a stable reference frequency, operates in a conventional manner to phase lock the VCO to the reference oscillator. The synthesizer output signal is used as a local oscillator (LO) signal during a receive mode and used at the same frequency as the carrier for a modulated data signal during a transmit mode.

In the preferred embodiment, the direct conversion receiver circuit 42 includes a circuit to multiply the frequency of the synthesizer output signal by N, where N is desired to be three but may be any integer of one or greater. A disadvantage of using a large integer is that the phase noise synthesizer output signal may degrade the sensitivity of the system. Due to commercial availability, the direct conversation receiver circuit 42 has been implemented in a model "UAA2080 Direct Conversion Data Rate Receiver" manufactured by Philips Semiconductor, a subsidiary of Philips North America, that includes a multiplier circuit to multiply the frequency of the synthesizer output signal by a factor of six. Accordingly, the synthesizer output signal has a frequency range of 1/N times the frequency range of the communications link 13.

In the transmit mode, the synthesizer 43 receives a data signal, including the application data, from a microcontroller system 44 and issues an FSK modulated synthesizer output signal where the FSK modulation corresponds to the application data that is to be communicated to the base transceiver 14. The synthesizer output signal has a frequency range of 1/N times the frequency range and a frequency deviation of 1/N times the frequency deviation of the communications link 13. The direct conversion receiver circuit 42 multiplies the frequency of the synthesizer output signal by N to provide the RF data signal. A transmitter coupler 45, such as a tuned transformer, passes the RF data signal from the direct conversion receiver circuit 42 to the power amplifier 40.

In the receive mode, the direct conversion receiver circuit 42 applies the LO signal to downconvert the RF return signal to baseband. The logic levels of the baseband are hard limited and issued in a signal to a baseband filter 46. The baseband filter 46 uses digital logic to filter the hard limited, baseband signal and to issue a filtered baseband signal to a frequency discriminator 47. The frequency discriminator 47 demodulates the baseband signal and issues a demodulated baseband return signal to a bit synchronizer 48. In the preferred embodiment, the baseband filter 46 passes digital signals below approximately 2.4 kilo baud. The bit synchronizer 48 synchronizes the phase of an internal bit clock signal to the demodulated return signal during the preamble included at the start of the return signal. When the bit clock signal has been synchronized, the bit synchronizer 48 issues the demodulated return signal and the bit clock signal to a frame synchronizer 50. The frame synchronizer 50 checks for the frame character following the preamble. When the frame character is recognized, the frame synchronizer 50 issues the demodulated return signal and an enable signal to a gate 52. When the enable signal is recognized, the gate 52 passes the demodulated return signal, including the control information that was communicated from the base transceiver 14, to the microcontroller system 44. In the preferred embodiment, the baseband filter 46, the frequency discriminator 47, the bit synchronizer 48, the frame synchronizer 50, and the gate 52 are implemented in a model "XC3064L" field programmable gate array (FPGA) manufactured by Xilinx Corporation. Several types of equivalent circuits are available from many manufacturers. Typically, an FPGA type is used for prototyping and low volume manufacturing, a mask type gate array from a manufacturer such as Motorola Corporation or LSI Logic Corporation used for a middle volume of manufacturing, and a custom circuit from a manufacturer such as Motorola Corporation or LSI Logic Corporation is used for a high volume of manufacturing.

The microcontroller system 44 includes a microcontroller, a read only memory (ROM), a random access memory (RAM), an electrically erasable programmable ROM (EEPROM) memory, and a real time clock (RTC). The microcontroller includes a system clock to provide a system clock signal to operate the microcontroller system 44. An executable code is stored in the ROM. Variable data is stored in the RAM and the EEPROM. The microcontroller system 44 operates in a conventional manner to receive digital signals, to execute instructions pre-programmed in the executable code, to retrieve variable data, and to issue digital signals based upon the executable code and the variable data. The microcontroller may be a 8051 class device, such as a model "87L51FB" manufactured by Philips Semiconductor, that includes internal one time programmable (OTP) ROM and RAM. Other microcontroller models are available that include electrically programmable ROM (EPROM), masked ROM, and/or EEPROM. Typically, an EPROM model is used to store the executable code for prototyping and a low volume manufacturing, an OTP model is used for a middle volume of manufacturing, and a masked ROM model is used for a high volume of manufacturing. Optionally, some or all of the ROM and the RAM may be external to the microcontroller. The listing of the specific types of memory is not intended to preclude the use of various other memory types for storing the executable code and the variable data.

The real time clock (RTC) includes a RTC memory to receive and to store the selected time for the next communications burst, a timer to monitor time of day and to provide a start signal when the time of day is the selected time, and a RTC battery to supply operating power to the RTC memory and the RTC timer. When the RTC issues the start signal, the microcontroller controls the remote transceiver to wake up from a standby mode in order to transmit the wireless data signal. During the standby mode the microcontroller system 44 controls the system clock to operate at a low clock rate in order to reduce power consumption. The microcontroller responds to the start signal by increasing the clock rate of the system clock to a higher rate in order to process program instructions more rapidly. Optionally, the microcontroller system 44 may use a static microprocessor, such as a model in the "CPU32" family manufactured by Motorola Corporation having the capability of executing an "LPstop" instruction in executable code. The LPstop instruction causes the microcontroller to inhibit or disable the system clock signal, thereby reducing power consumption in the microcontroller system to substantially zero.

An interface 75 receives source data in an application data signal from a data source 76 and issues a responsive, signal to the microcontroller system 44. The microcontroller system 44 processes the source data and provides application data in the data signal to the synthesizer 43. In one application of the present invention, the interface 75 is a reed switch to issue an electrical pulse for each turn of a shaft in a gas meter where a magnet is mounted on the shaft and turns of the shaft represent the flow of gas.

A battery 77 supplies power to a power supply 79. The power supply 79 supplies operating power to the microcontroller system 44, the interface 75, the direct conversion receiver circuit 42, the synthesizer 43, the baseband filter 46, the frequency discriminator 47, the bit synchronizer 48, the frame synchronizer 50, the gate 52, the LNA 38, and the power amplifier 40. During the transmit mode, the power supply 79 is controlled by the microcontroller system 44 to inhibit the operating power to the LNA 38. During the receiver mode the power supply 79 is controlled by the microcontroller system 44 to inhibit the operating power to the power amplifier 40. During the standby mode the power supply 79 is controlled by the microcontroller system 44 to inhibit the operating power to the direct conversion receiver circuit 42, the synthesizer 43, the baseband filter 46, the frequency discriminator 47, the bit synchronizer 48, the frame synchronizer 50, the gate 52, interface 75, the LNA 38, and the power amplifier 40.

Figure 3:
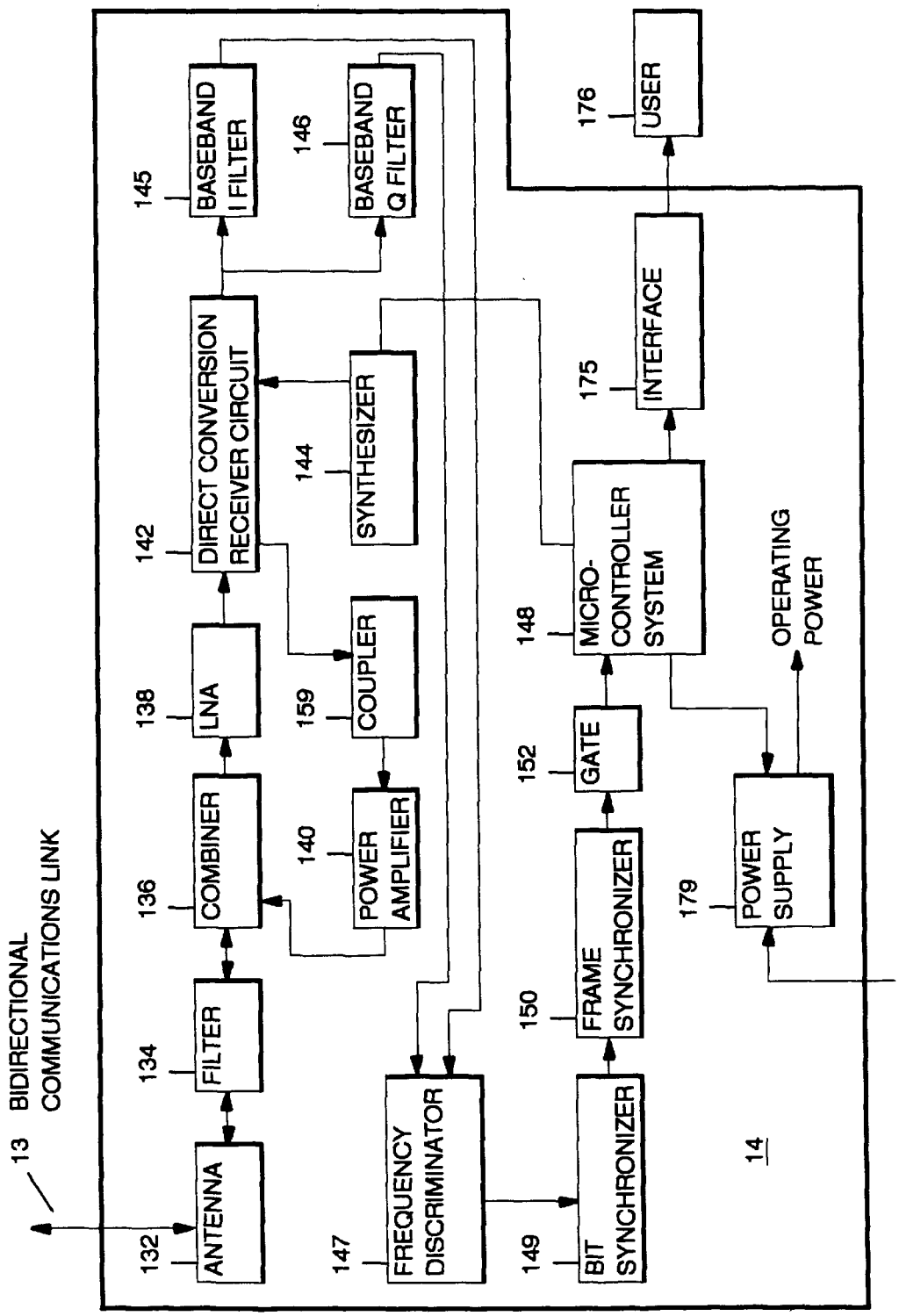
FIG. 3 is a block diagram of a base transceiver of the wireless communication system of FIG. 1.

FIG. 3 illustrates the base transceiver 14, which includes an antenna 132, such as a dipole, tuned to radiate wireless signals in the frequency range of the communications link 13. The antenna 132 receives the wireless data signal from the remote transceiver 12, 16 and/or 18 and issues a responsive, conducted, radio frequency (RF) data signal through a filter 134 to a combiner 136. The filter 134 may be implemented as a three pole ceramic, tuned for a maximally flat passband in the frequency range of the bidirectional communications link 13 with approximately three dB increased insertion loss at the highest and lowest frequencies of the bilateral communication link 13. The antenna 132 further receives a conducted, RF return signal through the filter 134 from the combiner 136 and responsively transmits the wireless return signal. The combiner 136 issues the RF data signal to a low noise amplifier (LNA) 138 and receives the RF data signal from a power amplifier 140. In the preferred embodiment, the combiner 136 is a "Wilkenson" bridge providing a nominal thirty dB of isolation between a first RF signal received from the power amplifier 140 and a second RF signal passed to the LNA 138, the LNA 138 has a nominal gain of thirteen to fifteen dB and a nominal noise figure of 1.5 dB, and the power amplifier 140 has a nominal gain of twenty to thirty dB and a nominal output power of zero dBm. A direct conversion receiver circuit 142 receives an amplified RF data signal from the LNA 138 and receives a synthesizer output signal from a synthesizer 144. The synthesizer 144, including a voltage controlled oscillator (VCO) to generate the synthesizer output signal and a reference oscillator to generate a stable reference frequency, operates in a conventional manner to phase lock the VCO to the reference oscillator. The synthesizer output signal is used as a local oscillator (LO) signal at the expected frequency of the wireless data signal during a receive adjust mode, as an LO signal at the actual frequency of the wireless data signal during a receive data mode, and as the carrier for the carrier for an RF transmit signal during a transmit mode. The carrier frequency in the RF transmit mode is also the actual frequency.

In the preferred embodiment, the direct conversion receiver circuit 142 includes a circuit to multiply the frequency of the synthesizer output signal by N, where N is desired to be three but may be any integer of one or greater. A disadvantage of using a large integer is that the phase noise synthesizer output signal may degrade the sensitivity of the system. Due to commercial availability, the direct conversation receiver circuit 142 has been implemented in a model "UAA2080 Direct Conversion Data Rate Receiver" manufactured by Philips Semiconductor, a subsidiary of Philips North America, that includes a multiplier circuit to multiply the frequency of the synthesizer output signal by a factor of six. Accordingly, the synthesizer output signal has a frequency range of 1/N times the frequency range of the communications link 13.

In the receive adjust mode, the direct conversion receiver circuit 142 applies the LO signal to downconvert the RF data signal to an a baseband I signal and a baseband Q signal. The voltage levels of the I signal and the Q signal are hard limited and issued to an I baseband filter 145 and a Q baseband filter 146, respectively. The filters 145 and 146 pass filtered I and Q signals to a frequency discriminator 147. During the preamble, the frequency discriminator 147 processes the baseband I and Q signals to determine the frequency difference between the expected frequency and actual frequencies of the wireless data signal. At the end of the preamble, the frequency difference is passed to a microcontroller system 148 in a frequency difference signal. The microcontroller system 148 processes the frequency difference signal to provide a frequency control signal to control the synthesizer 144 to adjust the LO frequency to the actual frequency.

In the receive data mode, the frequency discriminator 147 demodulates the I and Q signals and issues a demodulated data signal. The demodulated data signal is received by a bit synchronizer 149 that synchronizes the phase of an internal bit clock signal to the demodulated data signal during the preamble. When the bit clock signal has been synchronized, the bit synchronizer 149 issues the demodulated data signal and the bit clock signal to a frame synchronizer 150. The frame synchronizer 150 checks for a frame character following the preamble. When the frame character is recognized, the frame synchronizer 150 issues the demodulated data signal and an enable signal to a gate 152. When the enable signal is recognized, the gate 152 passes the demodulated data signal including the application data that was communicated from the remote transceiver 14 to the microcontroller system 148.

In the preferred embodiment, the baseband I filter 145, the baseband Q filter 146, the frequency discriminator 147, the bit synchronizer 149, the frame synchronizer 150, and s the gate 152 are included in model XC3064L field programmable gate array (FPGA) manufactured by Xilinx Corporation. Several types of equivalent circuits are available from many manufacturers. Typically, an FPGA type is used for prototyping and low volume manufacturing, a mask type gate array is used for a middle volume of manufacturing, and a custom circuit is used for a high volume of manufacturing.

In the transmit mode, the synthesizer 144 receives a modulation signal from the microcontroller system 148 to modulate synthesizer output signal for frequency shift key (FSK) according to the control information that is to be communicated to the remote transceiver 12. The synthesizer output signal has a frequency range of 1/N times the frequency range and the desired frequency deviation of the bidirectional communications link 13. The direct conversion receiver circuit 142 multiplies the frequency of the synthesizer output signal by N to provide the RF data signal. A transmitter coupler 159, such as a tuned transformer, passes the RF data signal from the direct conversion receiver circuit 142 to the power amplifier 140.

The microcontroller system 148 includes a microcontroller, a read only memory (ROM), a random access memory (RAM), an electrically erasable programmable ROM (EEPROM) memory, and a real time clock (RTC). The microcontroller includes a system clock to provide a system clock signal to operate the microcontroller system 148. An executable code is stored in the ROM. Variable data is stored in the RAM and the EEPROM. The microcontroller system 148 operates in a conventional manner to receive digital signals, to execute instructions preprogrammed in the executable code, to retrieve variable data, and to issue digital signals based upon the executable code and the variable data. The microcontroller model may be a 8051 class device, such as a model "87L51FB" manufactured by Philips Semiconductor, that includes internal one time programmable (OTP) ROM and RAM. Other microcontrollers are available that include electrically programmable ROM (EPROM), masked ROM, and/or EEPROM. Typically, an EPROM model is used to store the executable code for prototyping and a low volume manufacturing, an OTP model is used for a middle volume of manufacturing, and a masked ROM model is used for a high volume of manufacturing. Optionally, some or all of the ROM and the RAM may be external to the microcontroller. The listing of the specific types of memory in the embodiment is not intended to preclude the use of various other memory types to store the executable code and the variable data.

The real time clock (RTC) includes a RTC memory to receive and to store the selected time for the next communications burst, a timer to monitor time of day and to provide a start signal when the time of day is the selected time, and a RTC battery to supply operating power to the RTC memory and the RTC timer. When the RTC issues the start signal, the microcontroller prepares the base transceiver 14 to receive the wireless data signal. The microcontroller system 148 receives the application data in the baseband data signal and issues application information indicative of the application data in a user output signal to an interface 175, such as a UART. The interface 175 issues a responsive user output signal to a user 176.

A power supply 179 receives power from a power line and supplies operating power to the microcontroller system 148, the direct conversion receiver circuit 142, the synthesizer 144, the baseband I filter 145, the baseband Q filter 146, the frequency discriminator 147, the bit synchronizer 149, the frame synchronizer 150, and the gate 152. In the receive adjust and receive data modes the power supply 179 is controlled by the microcontroller system 148 to supply operating power to the LNA 138 and not to the power amplifier 140. In the transmit mode the power supply 179 is controlled by the microcontroller system 148 to supply operating power to the power amplifier 140 and not to the LNA 138.

Figure 4A:
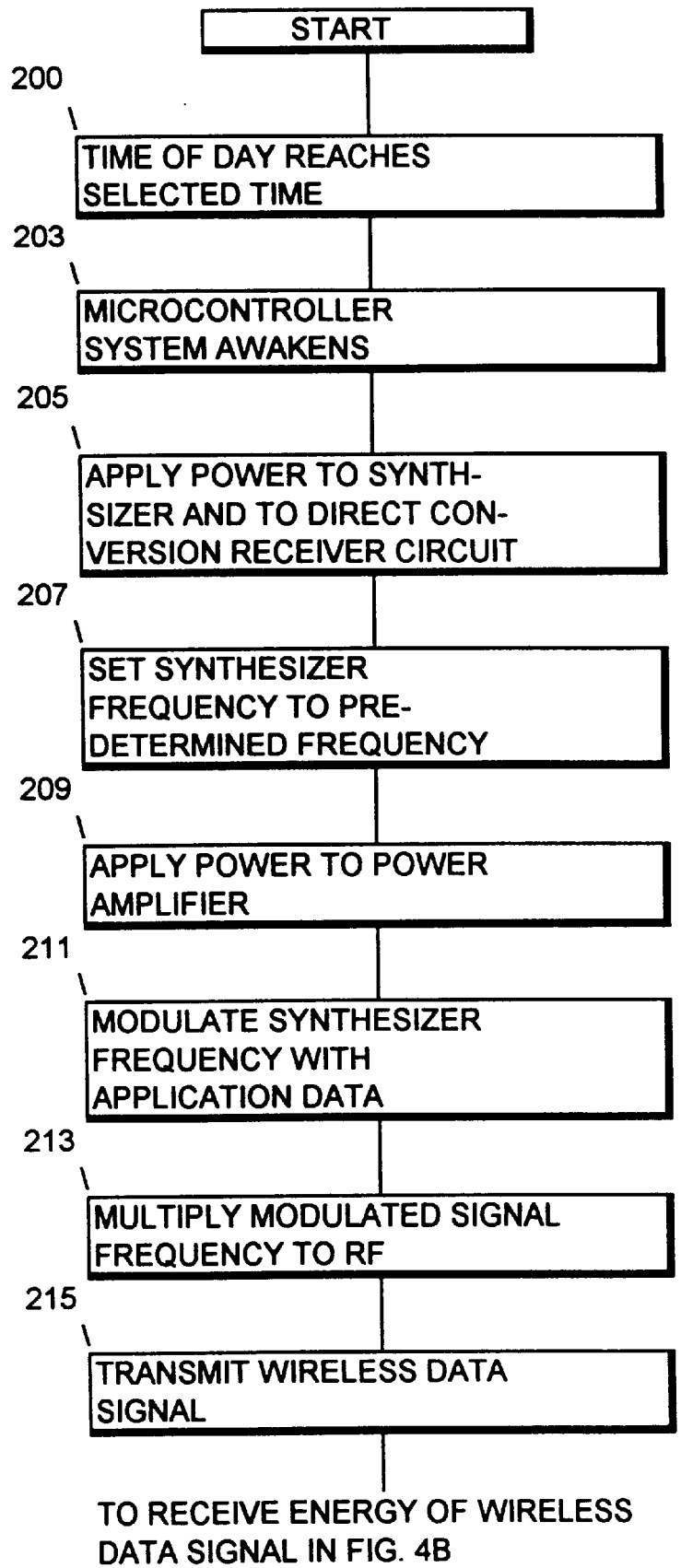
FIG. 4a is a flow chart of a method for transmitting a wireless data signal in the remote transceiver of FIG. 2.
Figure 4B:
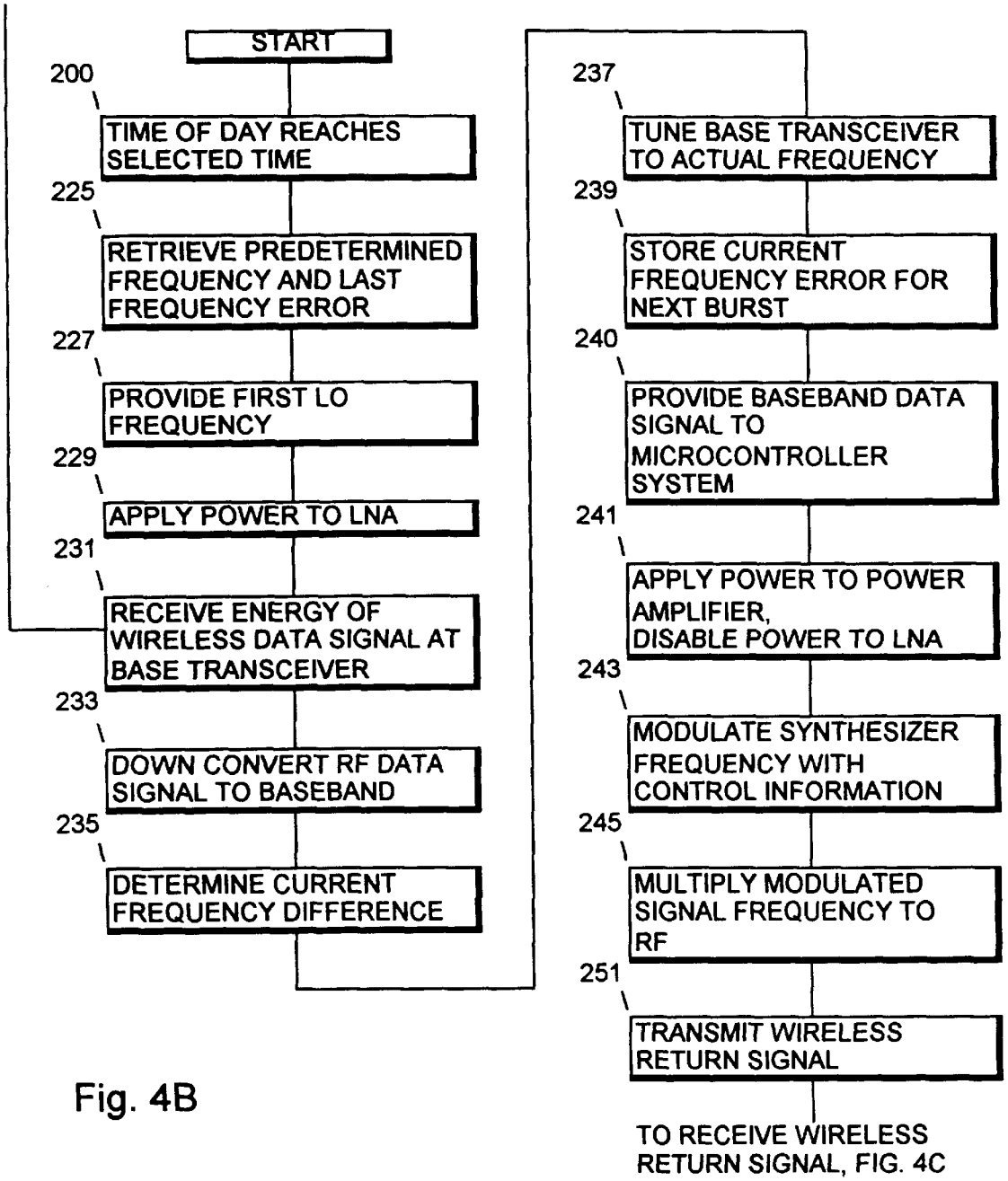
FIG. 4b is a flow chart of a method in the base transceiver of FIG. 3 for receiving the wireless data signal of FIG. 4a and transmitting a wireless return signal.
Figure 4C:
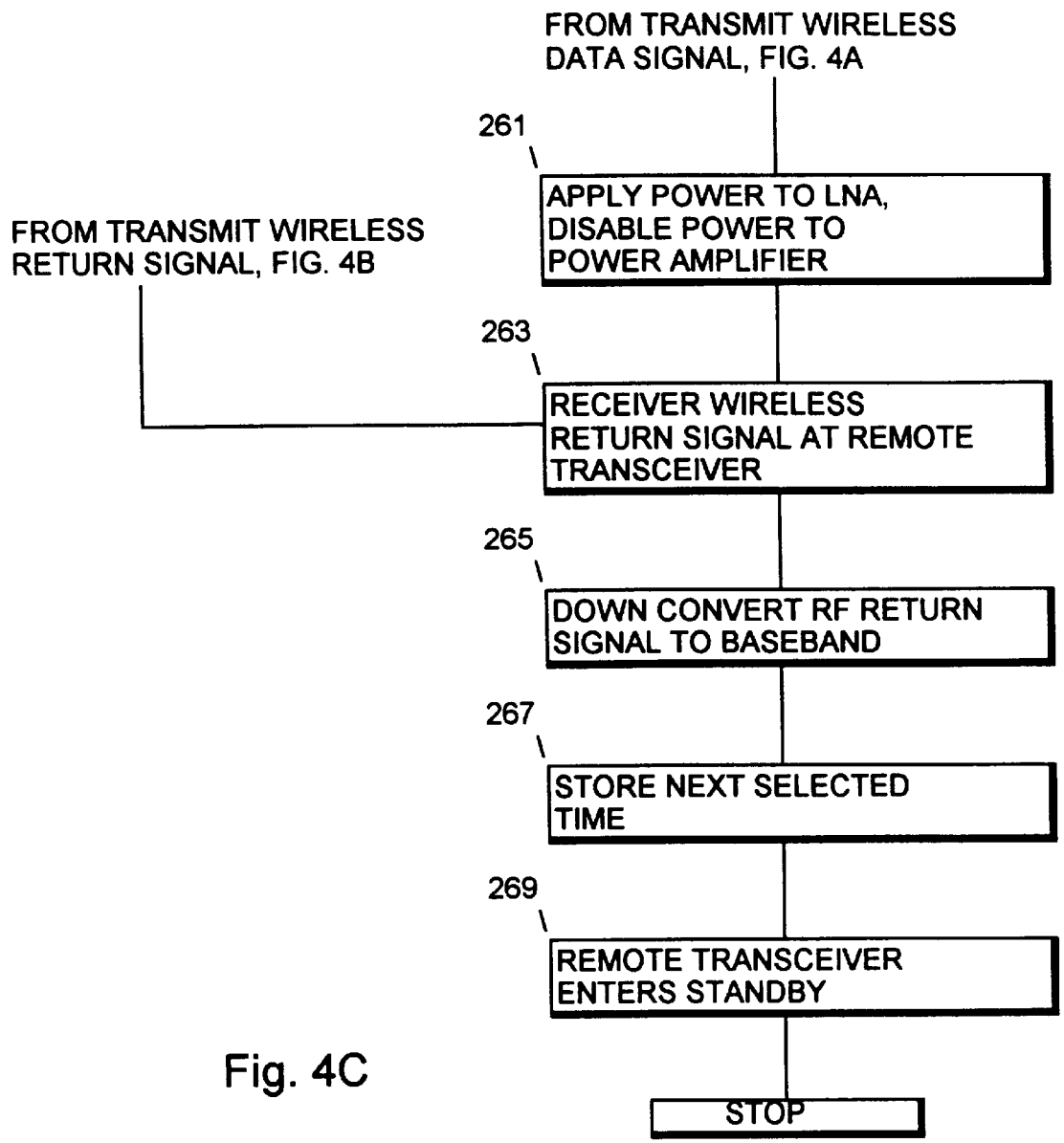
FIG. 4c is a flow chart of a method in the remote transceiver of FIG. 2 for receiving the wireless return signal of FIG. 4b.

FIGS. 4a, 4b, and 4c are flow charts illustrating the steps of a method for transmitting a wireless data signal from the remote transceiver 12 at the actual frequency that is different than the expected frequency and for responding with a wireless return signal from base transceiver 14 at the actual frequency. The remote transceiver 12 is pre-programmed with a time interval and the pseudo-random frequency sequence for transmitting the wireless data signal. In the preferred embodiment, the sequence is associated with a serial number. Upon installation, the remote transceiver 12 begins transmitting bursts at the selected time intervals and pre-determined frequencies. The base transceiver 14 intermittently scans frequencies in order to find newly installed remote transceivers 12, 16 and 18. The base transceiver 14 is either pre-programmed with the pseudo-random sequences for each remote transceiver 12, 16 and 18 or determines the pseudo-random sequence from the serial number of the remote transceiver 12, 16 and 18 that may be transmitted in the wireless data signal.

FIG. 4a illustrates the steps of a method whereby the remote transceiver 12 transmits the wireless data signal. At the start of the method of FIG. 4a, the selected time and the pre-determined frequency of the next wireless data signal burst are stored in the microcontroller system 44 in the remote transceiver 12. At a step 200, the time of day becomes equal to the selected time. Then, at a step 203, the microcontroller system 44 is awakened by a signal from the RTC. The microcontroller system 44 increases the clock rate of the system clock and then waits approximately 12 milliseconds. At a step 205, the microcontroller system 44 controls the power supply 79 to supply operating power to the synthesizer 43 and the direct conversion receiver circuit 42, and then waits approximately two to three milliseconds.

At a step 207 the microcontroller system 44 issues a frequency control signal to the synthesizer 43 to set the frequency of the synthesizer output signal to the pre-determined frequency and then waits approximately thirty milliseconds for the synthesizer 43 to phase lock. Then, at a step 209, the microcontroller system 44 controls the power supply 79 to supply operating power to the power amplifier 40, and at a step 211, the microcontroller system 44 issues a data signal to modulate the output signal frequency of the synthesizer 43. The data signal is a bit stream comprised of the preamble, followed by the frame character, and followed by the application data. In the preferred embodiment, the preamble is forty two bits of alternating 1's and 0's and the frame character is two eleven bit Barker sequences. The synthesizer 43 issues a modulated data signal having a carrier frequency and an FSK deviation of 1/N times the pre-determined frequency and 1/N times the desired frequency modulation deviation. At a step 213, the direct conversion receiver circuit 42 multiplies the synthesizer output frequency and frequency deviation by N and provides the RF data signal at the frequency of the bidirectional communications link 13. The RF data signal passes in succession through the transmit coupler 59, the power amplifier 40, the combiner 36, the filter 34, and the antenna 32. At a step 215, the wireless data signal is transmitted from the antenna 32.

FIG. 4b illustrates the steps of a method whereby the base transceiver 14 receives the wireless data signal. At the start of FIG. 4b, the selected time and the pre-determined frequency of the next wireless data signal burst and the frequency error of the last wireless data signal burst are stored in the microcontroller system 148. At a step 200, the time of day becomes equal to the selected time. Then, at a step 225, the RTC issues a digital signal to the microcontroller system 148 to indicate that a communications burst is about to begin. The microcontroller system 148 retrieves the expected frequency of the sum of the pre-determined frequency for the next wireless data signal burst and the frequency error of the last wireless data signal for the remote transceiver 12. At a step 227, the microcontroller system 148 issues a first frequency control signal to control the synthesizer 144 to generate a LO frequency of 1/N times the expected frequency. In a step 229, the microcontroller system 148 controls the power supply 179 to supply operating power to the LNA 138, and at a step 231, the antenna 132 receives the wireless data signal and responds by providing a conducted, RF data signal. The RF data signal passes through the filter 134, the combiner 136, and the LNA 138 to the direct conversion receiver circuit 142. Then, at a step 233, the direction conversion receiver circuit 142 frequency down converts the RF data signal and issues the baseband I and Q signals through the I filter 145 and the Q filter 146, respectively, to the frequency discriminator 147.

At a step 235, the frequency discriminator 147 processes the baseband I and Q signals during the preamble to determine the current frequency difference between the actual frequency of the wireless data signal and the expected frequency. At the end of the preamble, the frequency discriminator 147 passes the current frequency difference to the microcontroller 148 in the form of a frequency difference signal. In the preferred embodiment, the value of the frequency difference is contained in a nine bit word. At a step 237, the microcontroller system 148 tunes the base transceiver 14 to the actual frequency by controlling the synthesizer 144 to adjust the frequency of the synthesizer output signal to the actual carrier frequency of the wireless data signal. The frequency adjustment so determined compensates for the drift in the carrier frequency transmitted by the remote transceiver 12. At a step 239, the microcontroller system 148 stores the current frequency error as the last frequency error for use in receiving the next wireless data signal burst from the remote transceiver 12.

At a step 240, the frequency discriminator 147 converts the I and Q signals into a demodulated data signal by providing a first logic level when the I signal leads the Q signal and a second logic level when the Q signal leads the I signal. The frequency discriminator 147 passes the demodulated data signal to the bit synchronizer 149. The bit synchronizer 149 synchronizes the phase of the internal bit clock signal to the demodulated data signal during the preamble. When the internal clock has been synchronized, the bit synchronizer 149 issues the demodulated data signal and the internal clock signal to the frame synchronizer 150. The frame synchronizer 150 checks for the frame character. When the frame character is recognized, the frame synchronizer 150 issues the demodulated data signal and an enable signal to the gate 152. When the enable signal is recognized, the gate 152 passes the demodulated data signal, including the application data, to the microcontroller system 148. The microcontroller system 148 processes the application data to provide application information and passes the application information through the interface 175 to the user.

At a step 241, the microcontroller system 148 controls the power supply 179 to switch off the operating power to the LNA 138 and to switch on the operating power to the power amplifier 140. At a step 243, the microcontroller system 148 issues a digital return signal to modulate the output signal frequency of the synthesizer 144. The return signal is comprised of a bit stream including the preamble, followed by the frame character, and followed by the control information. In the preferred embodiment, the preamble is forty bits of alternating 1's and 0's and the frame character is two eleven bit Barker sequences. The synthesizer 144 issues a modulated data signal having a carrier frequency and an frequency deviation of 1/N times the RF carrier frequency and the desired frequency deviation, respectively. At a step 245, the direct conversion receiver circuit 142 multiples the synthesizer output signal by N. The RF return signal passes in succession through the transmit coupler 159, the power amplifier 140, the combiner 136, the filter 134, and the antenna 132. At a step 251, the antenna 132 transmits the wireless return signal.

FIG. 4c illustrates the steps of a method whereby the remote transceiver 12 receives the wireless return signal. At a step 261, the microcontroller system 44 controls the power supply 79 to switch off the operating power to the power amplifier 40 and to switch on the operating power to the LNA 38. At a step 263, the antenna 32 receives the wireless return signal and responds by providing a conducted, RF return signal. The RF return signal passes through the filter 34, the combiner 36, and the LNA 38 to the direct conversion receiver circuit 42. At a step 265, the direction conversion receiver circuit 42 frequency down converts the RF return signal into an I signal and a Q signal and provides a demodulated return signal having a first logic level when the I signal leads the Q signal and a second logic level when the Q signal leads the I signal. The direct conversion receiver circuit 42 issues the demodulated return signal through the baseband filter 46 to the bit synchronizer 48. The bit synchronizer 48 synchronizes the phase of the internal bit clock signal to the demodulated return signal during the preamble. When the internal clock has been synchronized, the bit synchronizer 48 issues the demodulated return signal and the internal clock signal to the frame synchronizer 50.

The frame synchronizer 50 checks for the frame character. When the frame character is recognized, the frame synchronizer 50 issues the demodulated return signal and an enable signal to the gate 52. When the enable signal is recognized, the gate 52 passes the demodulated return signal including the control information to the microcontroller system 148. At a step 267, the microcontroller system 44 stores the control information including the next selected time. At a step 269, the remote transceiver 12 enters a standby mode. The microcontroller system 44 controls the power supply 79 to turn off operating power to the LNA 38, the power amplifier 40, the direct conversion receiver circuit 42, the synthesizer 43, the baseband filter 46, the frequency discriminator 47, the bit synchronizer 48, and frame synchronizer 50, and the gate 52. The microcontroller system 44 then controls itself to reduce the clock rate of the system clock and waits until awakened.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A frequency tolerant transceiver for communicating individually with each of a plurality of remote receivers, comprising:

a receiver for tuning to an expected frequency associated with a particular one of said remote transceivers and receiving energy in a data signal having an actual frequency from said particular remote transceiver, said actual frequency allowed to drift from said expected frequency;

a microcontroller coupled to the receiver for providing information for said expected frequency and determining said actual frequency from said expected frequency and frequency information derived from said energy in said data signal; and a transmitter coupled to the microcontroller for transmitting a return signal at said actual frequency to said particular remote transceiver.

2. The transceiver of claim 1, wherein:

the microcontroller is further for determining said expected frequency from a predetermined frequency and an expected frequency error.

3. The transceiver of claim 2, wherein:

the microcontroller is further for determining said expected frequency error from said predetermined frequency and a last actual frequency.

4. The transceiver of claim 1, wherein:

the microcontroller is further for providing information for said actual frequency to the receiver; and the receiver is further for tuning to said actual frequency for demodulating data from said data signal and passing said data to the microcontroller.

5. The transceiver of claim 4, wherein:

said data includes information from at least one of (i) a gas meter, (ii) a water meter, (iii) an electric meter, (iv) a thermostat, (v) a gas appliance, and (vi) an electric appliance.

6. The transceiver of claim 1, wherein:

the receiver includes a frequency discriminator for determining a current frequency error between said expected frequency and said actual frequency; and the microcontroller is further for determining said actual frequency from said current frequency error and said expected frequency.

7. The transceiver of claim 1, wherein:

said expected frequency is one of a pseudo-random sequence of frequencies.

8. The transceiver of claim 1, wherein:

the receiver and the transmitter share a signal generator for sequentially (i) using information for said expected frequency for generating a first local oscillator (LO) signal for tuning to said expected frequency and (ii) using information for said actual frequency for generating a second LO signal having said actual frequency for receiving said data signal and transmitting said return signal at said actual frequency.

9. A method in a frequency tolerant transceiver for allowing for respective carrier frequency drifts of a plurality of remote transceivers, comprising steps of:

tuning to an expected frequency associated with a particular one of said remote transceivers, receiving energy in a data signal having an actual frequency from said particular remote transceiver, said actual frequency allowed to drift from said expected frequency;

using said expected frequency and energy in said data signal for determining said actual frequency, and transmitting a return signal at said actual frequency to said particular remote transceiver.

10. The method of claim 9, wherein:

said expected frequency is determined from a predetermined frequency and an expected frequency error.

11. The method of claim 10, wherein:

said expected frequency error is determined from said predetermined frequency and a last actual frequency.

12. The method of claim 9, further including steps of:

tuning to said actual frequency; and demodulating data from said data signal at said actual frequency.

13. The method of claim 12, wherein:

said data includes information from at least one of (i) a gas meter, (ii) a water meter, (iii) an electric meter, (iv) a thermostat, (v) a gas appliance, and (vi) an electric appliance.

14. The method of claim 9, wherein:

the step of determining said actual frequency includes steps of determining a current frequency error between said expected frequency and said actual frequency; and using said current frequency error and said expected frequency for calculating said actual frequency.

15. The method of claim 9, wherein:

said expected frequency is one of a pseudo-random sequence of frequencies.

16. The method of claim 9, wherein:

the step of tuning to said expected frequency includes generating a first local oscillator (LO) signal having said expected frequency;

the step of receiving said data signal includes generating a second LO signal having said actual frequency; and the step of transmitting said return signal includes generating said second LO signal having said second frequency.

17. A communication system, comprising:

a plurality of remote transceivers for transmitting respective data signals, each of said data signals having an actual frequency that is allowed to drift from an expected frequency; and a base transceiver having a receiver for tuning to said expected frequency associated with a particular one of said remote transceivers and then receiving energy in said data signal from said particular remote transceiver, a microcontroller coupled to the receiver for determining said actual frequency for said data signal from said expected frequency and frequency information derived from said energy, and a transmitter coupled to the microcontroller for transmitting a return signal at said actual frequency to said particular remote transceiver.

18. The system of claim 17, wherein:

the microcontroller is further for determining said expected frequency from a predetermined frequency and an expected frequency error.

19. The system of claim 18, wherein:

the microcontroller is further for determining said expected frequency error from said predetermined frequency and a last actual frequency.

20. The system of claim 17, wherein:

the microcontroller is further for providing information for said actual frequency to the receiver; and the receiver is further for tuning to said actual frequency for demodulating data from said data signal and passing said data to the microcontroller.

21. The system of claim 20, wherein:

said data includes information from at least one of (i) a gas meter, (ii) a water meter, (iii) an electric meter, (iv) a thermostat, (v) a gas appliance, and (vi) an electric appliance.

22. The system of claim 20, wherein:

the receiver includes a frequency discriminator for determining a current frequency error between said expected frequency and said actual frequency; and the microcontroller is further for determining said actual frequency from said current frequency error and said expected frequency.

23. The system of claim 17, wherein:

said expected frequency is one of a pseudo-random sequence of frequencies.

24. The system of claim 20, wherein:

the receiver and the transmitter share a signal source for sequentially (i) using information for said expected frequency for generating a first local oscillator (LO) signal for tuning to said expected frequency and (ii) using information for said actual frequency for generating a second LO signal having said actual frequency for receiving said data signal and transmitting said return signal at said actual frequency.

* * * * *